(12) United States Patent
Niu et al.

(10) Patent No.: US 12,189,539 B2
(45) Date of Patent: Jan. 7, 2025

(54) DATA PROCESSING SYSTEM AND MEMORY MANAGEMENT METHOD OF DATA PROCESSING SYSTEM

(71) Applicant: ALIBABA (CHINA) CO., LTD., Zhejiang Province (CN)

(72) Inventors: Dimin Niu, San Mateo, CA (US); Yijin Guan, Beijing (CN); Tianchan Guan, Shanghai (CN); Shuangchen Li, Sunnyvale, CA (US); Hongzhong Zheng, Los Gatos, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 169 days.

(21) Appl. No.: 18/065,123

(22) Filed: Dec. 13, 2022

(65) Prior Publication Data
US 2024/0095179 A1   Mar. 21, 2024

(30) Foreign Application Priority Data
Sep. 21, 2022 (CN) .......................... 202211149992.5

(51) Int. Cl.
G06F 12/00     (2006.01)
G06F 12/0873   (2016.01)
G06F 12/1009   (2016.01)
G06F 12/122    (2016.01)

(52) U.S. Cl.
CPC ...... *G06F 12/1009* (2013.01); *G06F 12/0873* (2013.01); *G06F 12/122* (2013.01)

(58) Field of Classification Search
None
See application file for complete search history.

(56) References Cited

U.S. PATENT DOCUMENTS

2022/0012139 A1* 1/2022 Nowatzyk ........... G06F 11/1451

* cited by examiner

*Primary Examiner* — Daniel D Tsui
(74) *Attorney, Agent, or Firm* — WPAT, P.C.; Anthony King (57) ABSTRACT

A memory management method of a data processing system is provided. The memory management method includes: creating a first memory zone and a second memory zone related to a first node of a first server, wherein the first server is located in the data processing system, and the first node includes a processor and a first memory; mapping the first memory zone to the first memory; and mapping the second memory zone to a second memory of a second server, wherein the second server is located in the data processing system, and the processor is configured to access the second memory of the second server through an interface circuit of the first server and through an interface circuit of the second server.

18 Claims, 5 Drawing Sheets

DATA PROCESSING SYSTEM AND MEMORY MANAGEMENT METHOD OF DATA PROCESSING SYSTEM

PRIORITY CLAIM AND CROSS-REFERENCE

The present application claims priority to Chinese Patent Application No. 202211149992.5, filed on Sep. 21, 2022, which is incorporated by reference herein in its entirety.

BACKGROUND

The present disclosure relates to memory management and, more particularly, to a data processing system supporting a pooled memory, and a related memory management method.

With the development of information technology, such as big data technology and internet technology, a data center for processing huge volumes of data can play a vital role in an organization. The data center usually has numerous servers and storage spaces. However, different servers may have different storage occupancy rates, resulting in a waste of resources. For example, one server may use only half of its storage capacity, while another server needs more storage space than the amount of storage capacity thereof. For one thing, the situation described above will leave part of storage space unused; for another, the situation described above will degrade performance of a server which needs more storage space.

SUMMARY

The described embodiments provide a data processing system supporting a pooled memory, and a related memory management method.

Some embodiments described herein may include a memory management method of a data processing system. The memory management method includes: creating a first memory zone and a second memory zone related to a first node of a first server, wherein the first server is located in the data processing system, and the first node comprises a processor and a first memory; mapping the first memory zone to the first memory; and mapping the second memory zone to a second memory of a second server, wherein the second server is located in the data processing system, and the processor is configured to access the second memory of the second server through an interface circuit of the first server and through an interface circuit of the second server.

Some embodiments described herein may include a data processing system. The data processing system includes a first server and a second server. The first server includes a first node and a first interface circuit. The first node includes a processor and a first memory. The processor is configured to create a first memory zone and a second memory zone related to the first node, and map the first memory zone to the first memory. The second server includes a second memory and a second interface circuit. The first interface circuit is coupled to the second memory through the second interface circuit. The processor of the first server is configured to access the second memory of the second server through the first interface circuit and the second interface circuit, and map the second memory zone to the second memory of the second server.

With the use of the proposed memory management mechanism, a data processing system not only can expand storage capacity of each server/node, but also can utilize an interface circuit of each server to provide information on page allocation. The data processing system can reduce the number of page faults, mitigate the effect of page faults on performance, and increase the memory usage.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present.

To reduce a waste of resources, memories of servers in a data center can be pooled to provide a memory pool shared by the servers. For example, local servers disposed in the same rack can access a remote memory pool located in another rack with the use of an access layer switch and a network protocol, such as an Ethernet protocol. However, such approach not only needs additional memory, but also increase the cost of a rack. In addition, as Ethernet exhibits a longer latency, quality of service (QoS) depends quite a lot on network performance. Furthermore, when a remote machine for providing a remote memory pool fails or operates abnormally, each server related to the remote machine will be affected. In other words, such approach has a larger blast radius.

Moreover, one method of providing more storage space for a server/machine is to connect the server to an external memory to thereby increase available storage space. However, the relatively high cost of the memory would greatly increase the overall production costs. Further, as servers cannot share their memories with each other, a waste of resource is still an unsolved problem.

The present disclosure provides exemplary data processing systems, each of which can manage respective memories of servers located on the same local side to thereby realize a pooled host memory architecture and increase the memory usage. The exemplary data processing system can expand available storage capacity of a server without the use of an external memory. In addition, the exemplary data processing system can realize a pooled memory scheme on a local side, thus having a shorter network latency and a smaller blast radius. Note that the proposed memory management mechanism of a data processing system can track cold pages and hot pages with the use of hardware elements (e.g. an interface circuit that allows respective memories of different servers to be interconnected). Thus, the proposed memory management mechanism can reduce the number of page faults, mitigate the effect of page faults on performance, and reduce the memory overhead, thereby increasing the memory usage. Further description is provided below.

Figure 1:
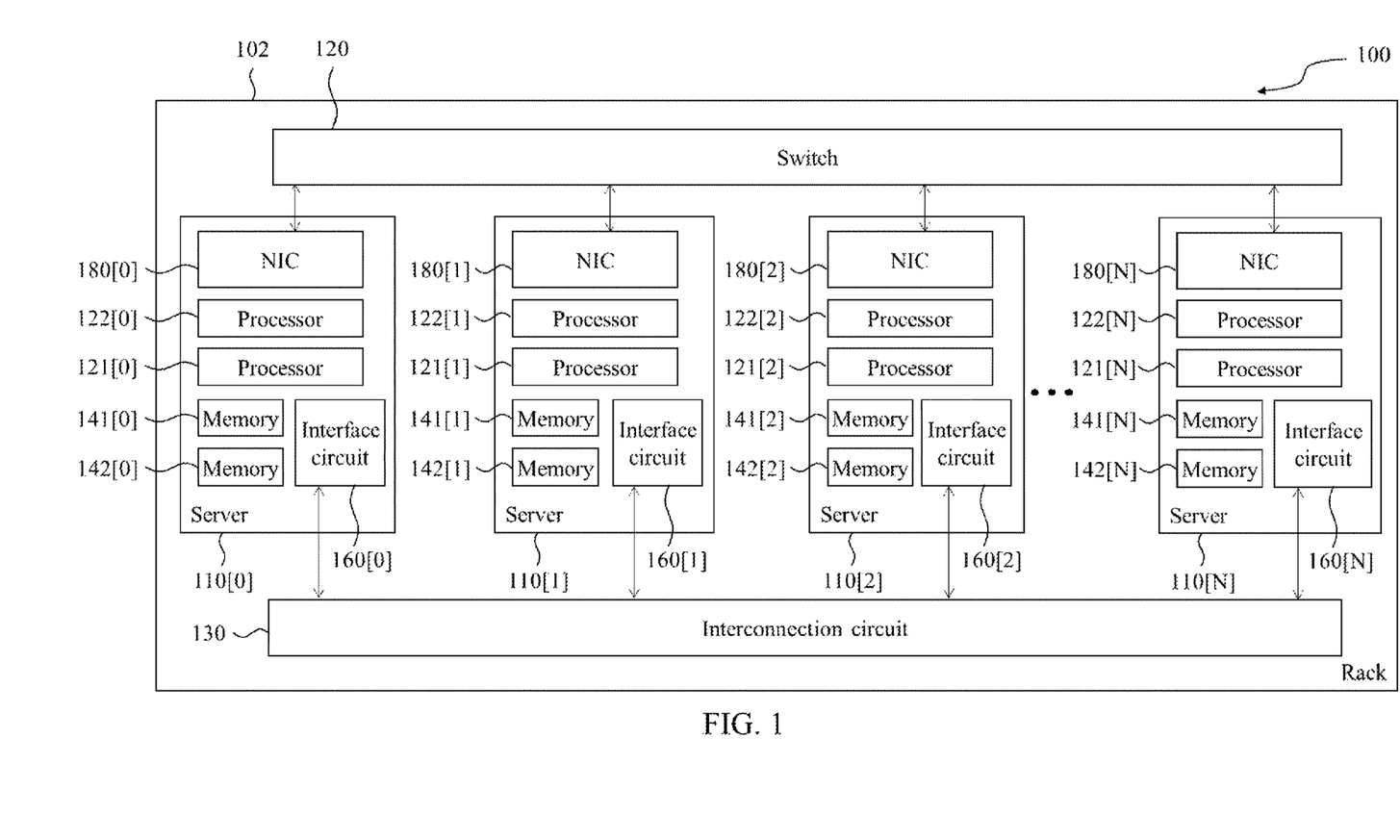
FIG. 1 is a block diagram illustrating an exemplary data processing system in accordance with some embodiments of the present disclosure.

FIG. 1 is a block diagram illustrating an exemplary data processing system in accordance with some embodiments of the present disclosure. The data processing system 100 may be at least a portion of a data center (not shown in FIG. 1). The data processing system 100 includes, but is not limited to a plurality of servers 110[0]-110[N], a switch 120 (e.g. a top-of-rack (ToR) switch) and an interconnection circuit 130, where N is a positive integer. In the present embodiment, the servers 110[0]-110[N], the switch 120 and the interconnection circuit 130 can be located in the same rack/chassis 102. By way of example but not limitation, each server can be implemented as a rack server, a blade server or other types of servers.

The servers 110[0]-110[N] located in the same rack 102 can be regarded as servers located one the host side or the local side. Each server may include, but is not limited to, at least one processor, at least one memory, an interface circuit and a network interface controller (NIC). For example, the server 110[0] may include processors 121[0] and 122[0], memories 141[0] and 142[0], an interface circuit 160[0] and a network interface controller 180[0]. The server 110[1] may include processors 121[1] and 122[1], memories 141[1] and 142[1], an interface circuit 160[1] and a network interface controller 180[1], and so on. For illustrative purposes, some implementations of a server are provided below with reference to the server 110[0]. Those skilled in the art should appreciate that other servers can be implemented in a same or similar manner.

The processors 121[0]/122[0] can be implemented using a central processing unit (CPU), a graphics processing unit (GPU) or other types of processors. The memory 141[0]/142[0] is coupled to the processors 121[0] and 122[0]. The interface circuit 160[0], coupled to the processors 121[0] and 122[0], is configured to provide an interface such that the memory 141[0]/142[0] and memories of other servers can be interconnected to thereby realize a memory pool. The interface circuit 160[0] may be referred to as a smart memory extension (SMX) card. In the present embodiment, the interface circuit 160[0] may be implemented using, but is not limited to, a system on chip (SoC) or a Field Programmable Gate Array (FPGA).

The network interface controller 180[0], coupled to the processors 121[0] and 122[0], is configured to allow the server 110[0] to be connected to other servers in a wired or wireless manner. For example, the server 110[0] can be coupled to a server on a remote side through the network interface controller 180[0] and the switch 120.

In addition, the servers 110[0]-110[N] can be interconnected with each other through the external interconnection circuit 130. Thus, the memories 141[0]-141[N] and 142[0]-142[N] disposed in the same rack 102 can form a memory pool, which realizes a pooled host memory. In other words, servers on the local side can share memory spaces with each other. One server can utilize an unused memory space of other servers. In the present embodiment, the interconnection circuit 130 is configured to interconnect respective interface circuits of the servers 110[0]-110[N]. For example, the interconnection circuit 130 can realize a point-to-point interconnect between the interface circuits 160[0]-160[N]. As another example, the interconnection circuit 130 can be implemented using a switch circuit or a switch, thereby realizing an interconnect between the interface circuits 160[0]-160[N].

In the present embodiment, each of the interface circuits 160[0]-160[N] can be connected to interconnection circuit 130 according to a Compute Express Link (CXL) protocol. As the CXL protocol supports memory coherency, the servers 110[0]-110[N] can have a flexible memory sharing configuration. However, this is not intended to limit the scope of the present disclosure. In some embodiments, the interface circuits 160[0]-160[N] can be connected to interconnection circuit 130 according to other high-speed protocols or memory coherency protocols.

Note that a pooled host memory scheme realized by the data processing system 100 can finish calculation and storage operation at the local host (i.e. serves in the same rack 102 that is located at one side of the switch 120) without an additional memory of a remote server (e.g. a server located at another side of the switch 120). Thus, the pooled host memory scheme not only can have a relatively low manufacturing cost, but also can have a relatively short network latency and a relatively small blast radius.

Moreover, the memory management mechanism utilized by the data processing system 100 can map different memory zones to a local memory of a processor and a non-local memory (e.g. a memory that is coupled to the processor through an interface circuit), respectively. The memory management mechanism can track cold pages and hot pages though a hardware element (e.g. an interface circuit described above), thereby reducing memory overhead, increasing memory usage and mitigating the effects of page faults on performance. The proposed memory management mechanism can be applied to a system having a hybrid memory which includes a local memory and a non-local memory. Consider an example where the servers 110[0] and 110[1] are configured to perform cross-machine operation. The processor 121[0] of the server 110[0] can access the memory 141[1] located in the server 110[1] through the interface circuits 160[0] and 160[1]. As far as the processor 121[0] is concerned, the memory 141[1] can be regarded as a non-local memory or a remote memory. For example, in some cases where the processor 121[0] can access the memory 141[0] directly, the memory 141[0] can be regarded as a local memory. The processor 121[0] may map different memory zones to the memories 141[0] and 141[1], respectively, and perform memory management according to mapping information provided by the interface circuit 160[0].

Figure 2:
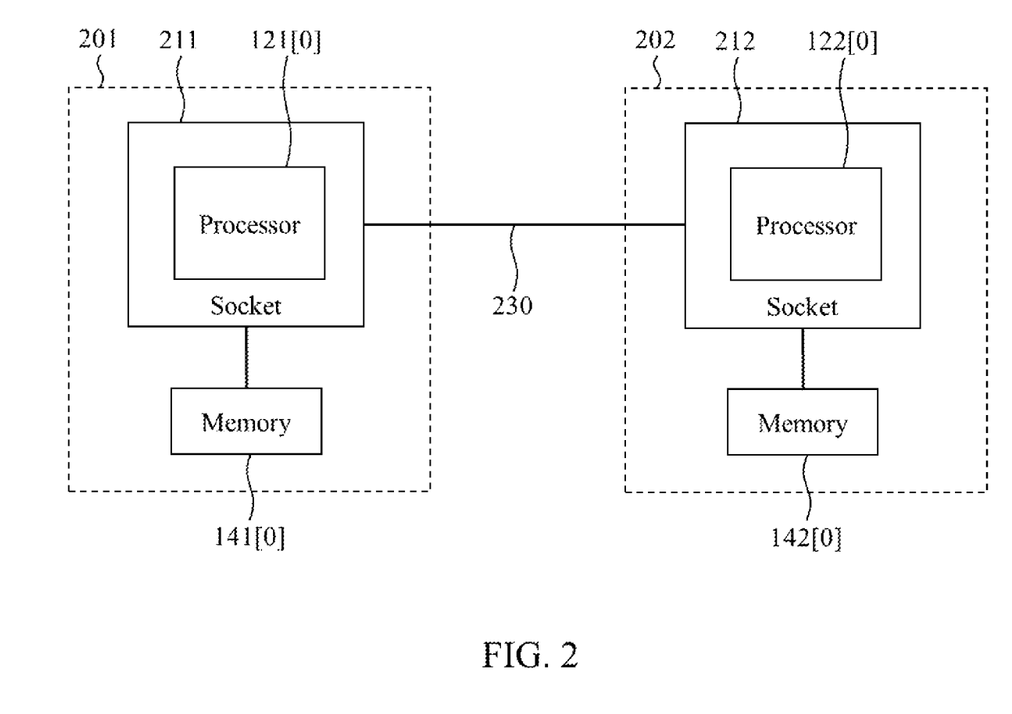
FIG. 2 is an implementation of the server shown in FIG. 1 employing the non uniform memory access architecture in accordance with some embodiments of the present disclosure.

In some embodiments, the proposed memory management mechanism may be used for managing a non-local memory defined by non uniform memory access (NUMA) architecture. FIG. 2 is an implementation of the server shown in FIG. 1 employing the NUMA architecture in accordance with some embodiments of the present disclosure. For illustrative purposes, the NUMA architecture is described with reference to the server 110[0] shown in FIG. 1. However, those skilled in the art can appreciate that one or more of the servers 110[1]-110[N] can be implemented using the NUMA architecture without departing from the scope of the present disclosure. In addition, the implementation of NUMA architecture employed by the server 110[0] may vary without departing from the scope of the present disclosure.

In the present embodiment, the server 110[0] may include a plurality of nodes (also referred to as a processing node or a NUMA node) 201 and 202, in which each node may include at least one processor and at least one memory. Processors of the same node can be disposed in the same socket, and memories of the same node can be connected to the same socket. By way of example but not limitation, the node 201 includes the processor 121[0] and the memory 141[0], in which the processor 121[0] is disposed in the socket 211, and the memory 141[0] is connected to the socket 211. In addition, the node 202 includes the processor 122[0] and the memory 142[0], in which the processor 122[0] is disposed in the socket 212, and the memory 142[0] is connected to the socket 212. The processor 121[0] of the node 201 can access the memory 142[0] of the node 202 through a node interconnection 230. As far as the processor 121[0] is concerned, the memory 141[0] is a local memory, while the memory 142[0] is a non-local memory. The processor 121[0] can create a first memory zone and a second memory zone related to the node 201, and map the first memory zone and the second memory zone to the memory 141[0] and the memory 142[0], respectively.

Similarly, the processor 122[0] of the node 202 can access the memory 141[0] of the node 201 through the node interconnection 230. As far as the processor 122[0] is concerned, the memory 142[0] is a local memory, while the memory 141[0] is a non-local memory. The processor 122[0] can create a first memory zone and a second memory zone related to the node 202, and map the first memory zone and the second memory zone to the memory 142[0] and the memory 141[0], respectively.

Figure 3:
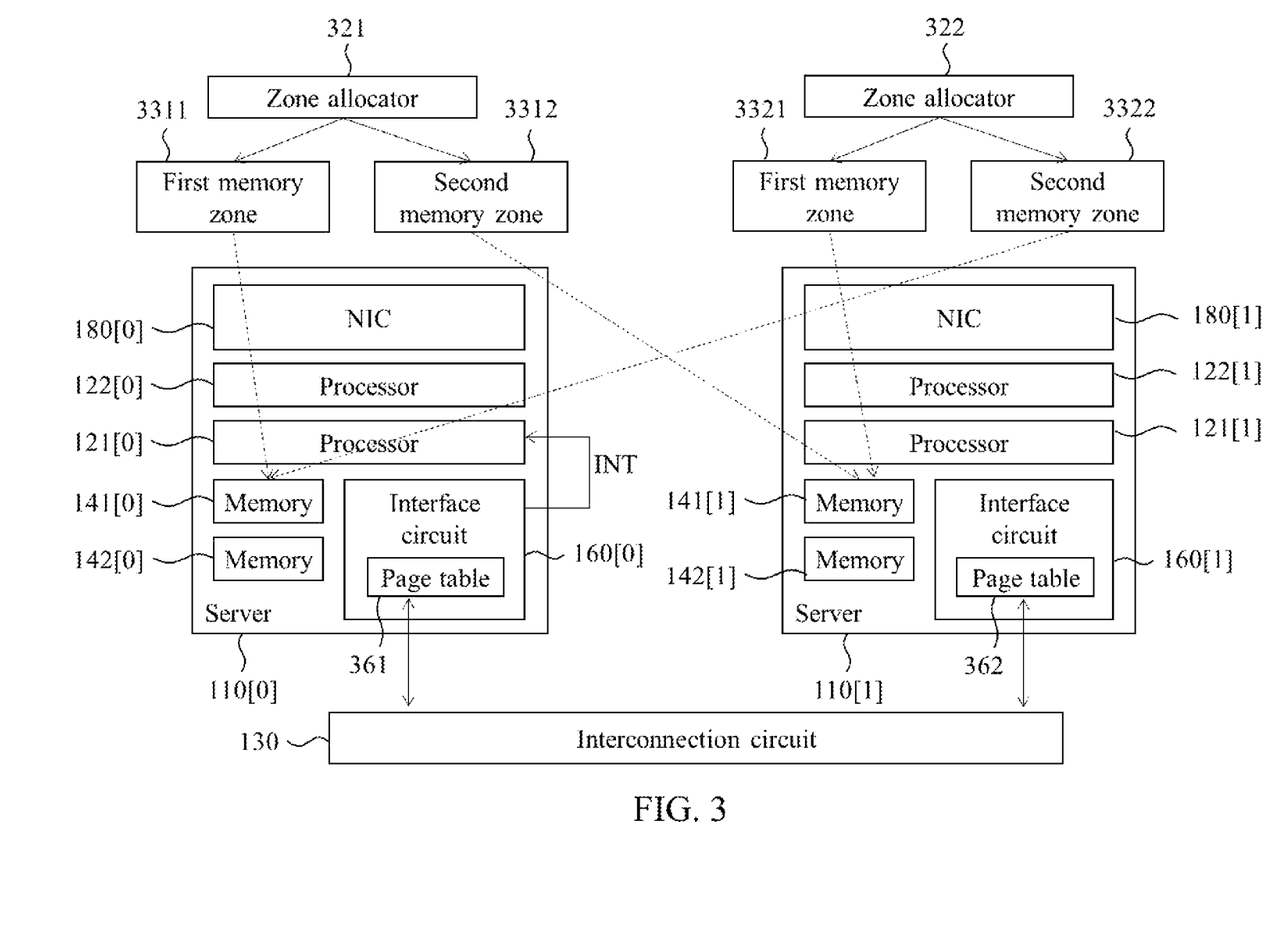
FIG. 3 is an implementation of a memory management mechanism applied to cross-machine operation associated with the servers shown in FIG. 1 in accordance with some embodiments of the present disclosure.

The proposed memory management mechanism can be used for managing a data processing system which includes a memory located within a node, a memory located outside the node, and a memory located outside a server. Referring to FIG. 3, an implementation of a memory management mechanism applied to cross-machine operation associated with the servers 110[0] and 110[1] shown in FIG. 1 is illustrated in accordance with some embodiments of the present disclosure. Although the memory management mechanism applied to cross-machine operation is described with reference to the servers 110[0] and 110[1] shown in FIG. 1, those skilled in the art can appreciate that the proposed memory management mechanism can be applied to other servers shown in FIG. 1 without departing from the scope of the present disclosure. For example, the server 110[1] shown in FIG. 3 may be replaced with any one of the servers 110[2]-110[N] shown in FIG. 1.

In the present embodiment, the memory 141[0] may be allocated to the processor 121[0] to serve as a local memory of the processor 121[0]. For example, the memory 141[0] and the processor 121[0] may correspond to the same node, such as the node 201 shown in FIG. 2. In addition, the processor 121[0] is configured to access the memory 141[1] (which can serve as a remote memory of the processor 121[0]) through the interface circuit 160[0], the interconnection circuit 130 and the interface circuit 160[1]. The processor 121[0], or an operating system running on the processor 121[0], can detect memory configurations to create related memory zones, thereby mapping a memory zone to a corresponding memory. By way of example but not limitation, during the bootup process of the server 110[0], the operating system or the processor 121[0] can detect memory configurations of the server 110[0] and activate the zone allocator 321, which can create the first memory zone 3311 and the second memory zone 3312 related to the processor 121[0]. In addition, the operating system, or the processor 121[0], can map the first memory zone 3311 and the second memory zone 3312 to the memory 141[0] and the memory 141[1], respectively. The operating system, or the processor 121[0], can map the second memory zone 3312 to the memory 141[1] according to data transmitted from the interface circuit 160[0].

Furthermore, the processor 121[0] can map the second memory zone 3312 to a remote memory located in another node, such as the memory 142[0] located in the node 202 shown in FIG. 2. Note that, in some embodiments, the operating system or the processor 121[0] may create a third memory zone (not shown) different from the memory zone 3311 and the second memory zone 3312, thereby mapping the third memory zone to a remote memory located in another node. In other words, remote memories of different types may be mapped to different memory zones.

When the processor 121[0] is configured to perform page allocation, the interface circuit 160[0] may provide information on page allocation of a remote memory. For example, the interface circuit 160[0] may store a page table 361, which can indicate a mapping relationship between a virtual address and a physical address corresponding to a memory page. In addition, the page table 361 may be utilized to record the number of times the memory page is accessed. The processor 121[0] can determine whether to perform page swapping according to the number of times, thereby making more efficient use of memory resources.

Similarly, the memory 141[1] may serve as a local memory of the processor 121[1], in which the memory 141[1] and the processor 121[1] may correspond to the same node. The processor 121[1] is configured to access the memory 141[0] (which can serve as a remote memory of the processor 121[1]) through the interface circuit 160[1], the interconnection circuit 130 and the interface circuit 160[0]. The processor 121[1], or an operating system running on the processor 121[1], can detect memory configurations and activate the zone allocator 322, thereby creating the first memory zone 3321 and the second memory zone 3322 related to the processor 121[1]. In addition, the operating system, or the processor 121[1], can map the first memory zone 3321 and the second memory zone 3322 to the memory 141[1] and the memory 141[0], respectively. The operating system, or the processor 121[1], can map the second memory zone 3322 to the memory 141[0] according to data transmitted from the interface circuit 160[1]. Moreover, the processor 121[1] can map the second memory zone 3322 (or a third memory zone different from the first memory zone 3321 and the second memory zone 3322) to a remote memory located in another node. The interface circuit 160[1] may store a page table 362, which can indicate a mapping relationship between a virtual address and a physical address corresponding to a memory page. The page table 362 may be utilized to record the number of times the memory page is accessed. The processor 121[1] can selectively perform page swapping according to the recorded number of times.

To facilitate an understanding of the present disclosure, the proposed memory management mechanism is described below with reference to a server employing the NUMA architecture shown in FIG. 2. However, this is provided for illustrative purposes, and is not intended to limit the scope of the present disclosure. In addition, the proposed memory management mechanism can be applied to a server or a data processing system, which supports a local memory and a non-local memory, without departing from the scope of the present disclosure. As long as a memory management mechanism of a memory pool is realized with the use of an interface circuit of a local server, associated modifications and alternatives fall within the scope of the present disclosure.

Referring to FIG. 3 and also to FIG. 2, the memory 141[0] may be a local memory located in a same node as the processor 121[0], the memory 142[0] may be a remote memory located in another node different from the node where the processor 121[0] is located, and the memory 141[1] may be a remote memory located in a server different from a server where the processor 121[0] is located. In operation, the processor 121[0] can map the first memory zone 3311 to the memory 141[0], and map the second memory zone 3312 to the memory 142[0] and the memory 141[1]. The remote memory (i.e. the memory 141[1]) located in the server 110[1] is equivalently mapped to the node 202. The operating system running on the processor 121[0] can manage the memory 141[1] in a manner similar to that used for managing the memory 142[0] of the node 202.

The processor 121[0] can utilize different allocation policies to allocate memory pages. In some examples, the processor 121[0] may preferentially allocate a memory page to a local memory (i.e. the memory 141[0]) or a memory located in the server 110[0]. When the memory 141[0] or the memory 142[0] has a free space, the processor 121[0] is configured to allocate a memory page associated with a process running on the node 201 to the free space. When each of the memory 141[0] and the memory 142[0] is full, the processor 121[0] is configured to allocate the memory page to the memory 141[1] of the server 110[1]. In some examples, the processor 121[0] can allocate memory pages according to a predetermined order of priority. By way of example but not limitation, the predetermined order of priority may be as follows: a local memory in the node 201, a remote memory in the server 110[0], and a remote memory accessed through the interface circuit 160[0]. In other words, the processor 121[0] may preferentially allocate a memory page to the memory 141[0]; when the memory 141[0] is full, the processor 121[0] may preferentially allocate a memory page to the memory 142[0]. In some examples, the processor 121[0] can allocate a plurality of memory pages associated with a process running on the node 201 to the memory 141[0], the memory 142[0] and the memory 141[1] in an interleaved manner. Contiguous memory pages can be allocated to different memories 141[0], 142[0] and 141[1].

Figure 4:
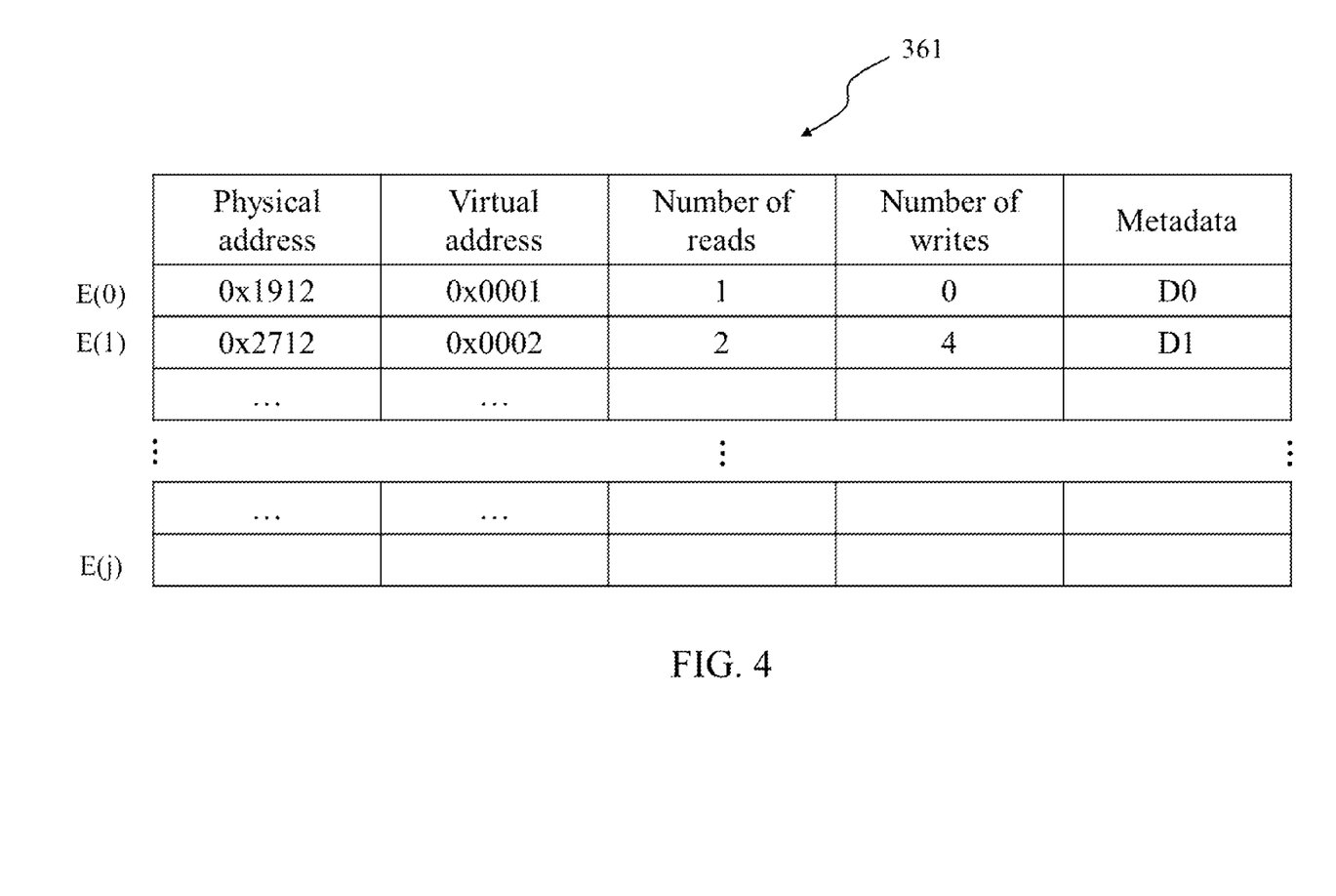
FIG. 4 is an implementation of the page table shown in FIG. 3 in accordance with some embodiments of the present disclosure.

During memory page allocation, the operating system or the processor 121[0] can identify page(s) used for storing page table information, and selectively override the allocation policy according to the stored page table information. FIG. 4 is an implementation of the page table 361 shown in FIG. 3 in accordance with some embodiments of the present disclosure. Referring to FIG. 4 and also to FIG. 3, the processor 121[0] can allocate a memory page related to a process running on the node 201 to the memory 141[1], and the interface circuit 160[0] can be configured to store the page table 361, which indicates a mapping relationship between a virtual address and a physical address corresponding to the memory page. For example, the page table 361 may include a plurality of entries E(0)-E(j), where j is a positive integer. The entry E(0) may store the virtual address 0x0001 and the physical address 0x1912 corresponding to a memory page; the entry E(1) may store the virtual address 0x0002 and the physical address 0x2712 corresponding to another memory page. The processor 121[0] can identify a page used for storing the page table 361, and perform page allocation according to the page information indicated by the page table 361.

The interface circuit 160[0] may utilize the page table 361 to track cold page(s) and hot page(s), and provide corresponding page information to the processor 121[0]. For example, the page table 361 can record the number of times a memory page allocated to a remote memory is accessed. When the number of times the memory page is accessed reaches a predetermined number of times, the processor 121[0] can swap the memory page (e.g. a hot page) and a memory page allocated to the memory 141[0] (e.g. a cold page of a local memory). The processor 121[0] may determine the memory page to be swapped out (i.e. the memory page allocated to the memory 141[0]) according to a least recently used (LRU) algorithm, a least frequently used (LFU) algorithm or other determination criteria. In other words, the information recorded by the page table 361 may trigger the processor 121[0] (or the operating system running thereon) to perform page migration, thereby swapping a memory page of a local memory and a memory page of a remote memory.

In the present embodiment, each entry of the page table 361 records the number of page reads and the number of page writes corresponding to a memory page. The number of times the memory page is accessed can be represented by the number of page reads or the number of page writes. When the number of page reads or the number of page writes reaches four, it means that the corresponding memory page is a hot page. As the number of page writes in the entry E(1) is 4, the interface circuit 160[0] may send an interrupt request INT to the processor 121[0] to thereby trigger the processor 121[0] to perform page migration. In some embodiments, the number of times the memory page is accessed can be represented by a sum of the number of page reads and the number of page writes.

Each entry in the page table 361 may further record metadata of a memory, to which a corresponding memory page is allocated. The metadata can be indicative of a memory type of the memory. By way of example but not limitation, the entry E(0) may record a mapping relationship between a virtual address and a physical address corresponding to a memory page that is allocated to the memory 141[1], and the entry E(1) may record a mapping relationship between a virtual address and a physical address corresponding to a memory page that is allocated to the memory 141[2]. The metadata D0 may indicate the memory type of the memory 141[1], and the metadata D1 may indicate the memory type of the memory 141[2]. When the number of times a memory page corresponding to the entry E(0) is accessed and the number of times a memory page corresponding to the entry E(1) is accessed both reach the predetermined number of times, the processor 121[0] may determine which one of the memory 141[1] and the memory 141[2] has a slower operating speed according to the metadata D0 and D1. Next, the processor 121[0] may swap the memory page, which comes from the memory having the slower operating speed, for a memory page of a local memory.

The implementation of the page table shown in FIG. 4 is provided for illustrative purposes, and is not intended to limit the scope of the present disclosure. In some embodiments, a portion of bits of a virtual address stored in each entry can be indicative of a server where the corresponding memory page is allocated. For example, in some cases where the entry E(0) records a mapping relationship between a virtual address and a physical address corresponding to a memory page which is allocated to the memory 141[1], a portion of bits (e.g. most significant bit(s)) of the virtual address stored in the entry E(0) may indicate that the memory page is allocated to the server 110[1].

With the use of the proposed memory management mechanism, a data processing system not only can expand storage capacity of each server/node, but also can utilize an interface circuit of each server to provide information on page allocation. The data processing system can reduce the number of page faults, mitigate the effect of page faults on performance, and increase the memory usage.

Note that the proposed memory management mechanism may be applied to servers/nodes located in different racks to thereby mitigate the effect of page faults on performance. For example, in some embodiments, the servers 110[0] and 110[1] shown in FIG. 3 may be located in different racks. The processor of one of the servers 110[0] and 110[1] may access the memory of the other server through respective interface circuits of the servers 110[0] and 110[1]. As long as a memory management mechanism can utilize respective interface circuits of servers located in different racks to manage a data processing system, which includes a memory in a node, a memory outside the node, and/or a memory outside a server where the node is located, associated modifications and alternatives fall within the scope of the present disclosure.

Figure 5:
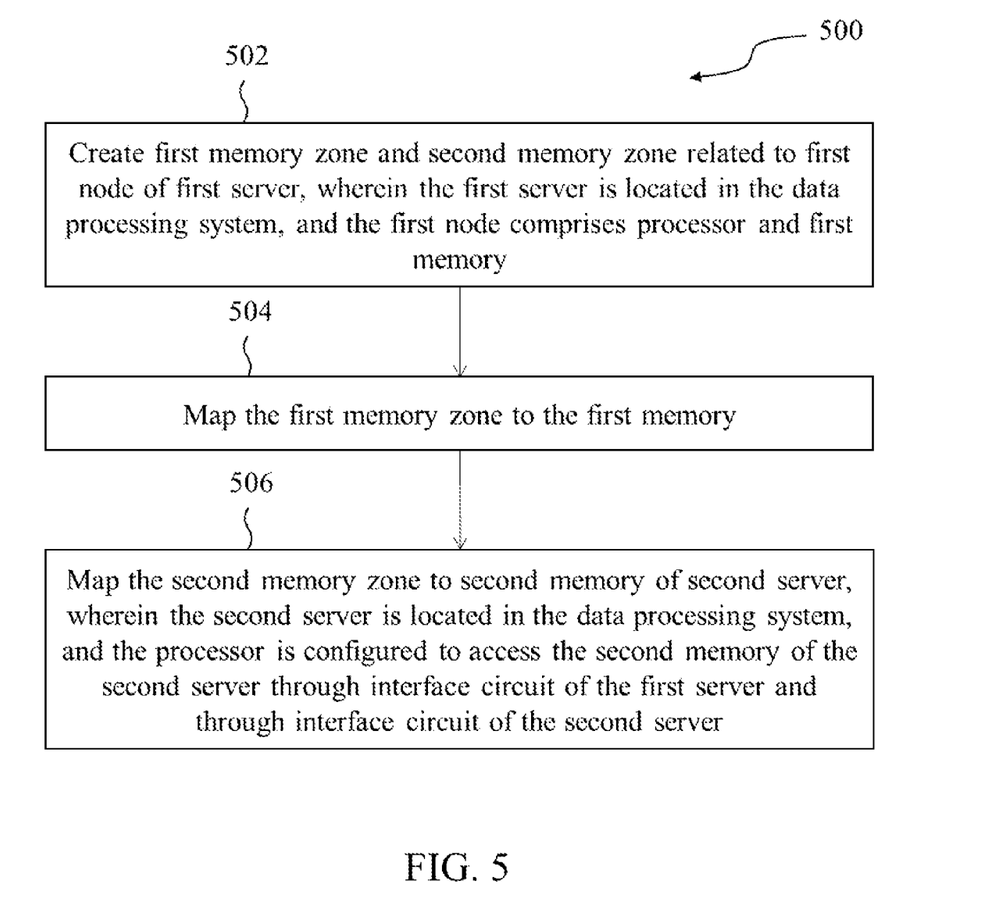
FIG. 5 is a flow chart of a memory management method of a data processing system in accordance with some embodiments of the present disclosure.

FIG. 5 is a flow chart of a memory management method of a data processing system in accordance with some embodiments of the present disclosure. For illustrative purposes, the memory management method 500 is described with reference to the NUMA architecture shown in FIG. 2 and the servers 110[0] and 110[1] shown in FIG. 3. Note that the memory management method 500 can be applied to each server shown in FIG. 1 and/or other NUMA architecture without departing from the scope of the present disclosure. In addition, in some other embodiments, the memory management method 500 may include other operations. In some embodiments, operations of the memory management method 500 can be performed in a different order and/or vary.

At operation 502, a first memory zone and a second memory zone related to a first node of a first server are created, wherein the first server is located in the data processing system, and the first node comprises a processor and a first memory. For example, the processor 121[0] (or an operating system) can activate the zone allocator 321 to create the first memory zone 3311 and the second memory zone 3312 related to the node 201. The processor 121[0] can detect memory configurations and activate the zone allocator 321 during the bootup process of the server 110[0].

At operation 504, the first memory zone is mapped to the first memory. For example, the processor 121[0] can map the first memory zone 3311 to the memory 141[0], which is a local memory located in the node 201.

At operation 506, the second memory zone is mapped to a second memory of a second server. The second server is located in the data processing system. The processor is configured to access the second memory of the second server through an interface circuit of the first server and through an interface circuit of the second server. For example, the processor 121[0] can map the second memory zone 3312 to the memory 141[1], which is a remote memory located in the server 110[1].

In some embodiments, the second memory zone can be mapped to a third memory included in a second node, wherein the processor of the first node is configured to access the third memory of the second node through a node interconnection. For example, the processor 121[0] can map the second memory zone 3312 to the memory 142[0], which is a remote memory located in the node 202. With the use of mapping of a hybrid memory, the proposed memory management method can expand storage capacity and maintain good performance.

In some embodiments, a first memory page associated with a process running on the first node may be allocated to the second memory. In addition, the interface circuit of the first server may be utilized to store a page table, which indicates a mapping relationship between a virtual address and a physical address corresponding to the first memory page. For example, the processor 121[0] may allocate a memory page associated with a process running on the node 201 to the memory 141[1]. The interface circuit 160[0] can store the page table 361, which indicates a mapping relationship between a virtual address and a physical address corresponding to the allocated memory page (e.g. the content stored in the entry E(0)/E(1) shown in FIG. 4). With the use of the information recoded in the page table 361, the interface circuit 160[0] may track cold page(s) and hot page(s), and trigger the processor 121[0] to perform page migration. In the embodiment shown in FIG. 4, the page table 361 may record the number of times a memory page is accessed, such as the number of page reads or the number of page writes. When the number of times the memory page is accessed reaches a predetermined number of times, the processor 121[0] may swap this memory page and another memory page that is allocated to the memory 141[0] (e.g. a cold page).

In some embodiments, the second server and the first server may be located in the same rack. For example, the servers 110[1] and 110[0] are both located in the rack 102 shown in FIG. 2. In some embodiments, the second server and the first server may be located in different racks. For example, the servers 110[1] and 110[0] are located in different racks. In other words, the memory management method 500 can be applied to a system having a hybrid memory (including a local memory and a non-local memory) to thereby mitigate the effect of page faults on performance and increase the memory usage. The system having the hybrid memory can include servers/nodes located in the same rack or located in different racks.

As those skilled in the art can understand operation of the memory management method 500 after reading the above paragraphs directed to FIG. 1 through FIG. 4, further description is omitted here for brevity.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory management method of a data processing system, comprising:
   creating a first memory zone and a second memory zone related to a first node of a first server, wherein the first server is located in the data processing system, and the first node comprises a processor and a first memory;
   mapping the first memory zone to the first memory;
   mapping the second memory zone to a second memory of a second server, wherein the second server is located in the data processing system, and the processor is configured to access the second memory of the second server through an interface circuit of the first server and through an interface circuit of the second server; and
   mapping the second memory zone to a third memory included in a second node of the first server, wherein the processor of the first node is configured to access the third memory of the second node through a node interconnection.

2. The memory management method of claim 1, further comprising:
   when the first memory or the third memory has a free space, allocating a memory page associated with a process running on the first node to the free space; and
   when each of the first memory and the third memory is full, allocating the memory page to the second memory of the second server.

3. The memory management method of claim 1, further comprising:
   allocating a plurality of memory pages associated with a process running on the first node to the first memory, the second memory and the third memory in an interleaved manner.

4. The memory management method of claim 1, further comprising:
   allocating a first memory page associated with a process running on the first node to the second memory; and
   utilizing the interface circuit of the first server to store a page table, wherein the page table indicates a mapping relationship between a virtual address and a physical address corresponding to the first memory page.

5. The memory management method of claim 4, further comprising:
   utilizing the page table to record a number of times the first memory page is accessed; and
   when the number of times the first memory page is accessed reaches a predetermined number of times, swapping the first memory page and a second memory page allocated to the first memory.

6. The memory management method of claim 5, wherein the step of swapping the first memory page and the second memory page comprises:
   determining the second memory page according to a least recently used algorithm or a least frequently used algorithm.

7. The memory management method of claim 5, further comprising:
   when the number of times the first memory page is accessed reaches the predetermined number of times, sending an interrupt request to an operating system running on the first node.

8. The memory management method of claim 4, further comprising:
   utilizing the page table to record metadata corresponding to the second memory, wherein the metadata is indicative of a memory type of the second memory.

9. The memory management method of claim 4, wherein a portion of bits of the virtual address is arranged to indicate that the first memory page is allocated to the second server.

10. A data processing system, comprising:
    a first server, comprising a first node and a first interface circuit, the first node comprising a processor and a first memory, wherein the processor is configured to create a first memory zone and a second memory zone related to the first node, and map the first memory zone to the first memory; and
    a second server, comprising a second memory and a second interface circuit, wherein the first interface circuit is coupled to the second memory through the second interface circuit; the processor of the first server is configured to access the second memory of the second server through the first interface circuit and the second interface circuit, and map the second memory zone to the second memory of the second server;
    wherein the first server further comprises a second node, and the processor is configured to access a third memory of the second node through a node interconnection, and map the second memory zone to the third memory.

11. The data processing system of claim 10, wherein when the first memory or the third memory has a free space, the processor is configured to allocate a memory page associated with a process running on the first node to the free space; when each of the first memory and the third memory is full, the processor is configured to allocate the memory page to the second memory of the second server.

12. The data processing system of claim 10, wherein the processor is configured to allocate a plurality of memory pages associated with a process running on the first node to the first memory, the second memory and the third memory in an interleaved manner.

13. The data processing system of claim 10, wherein the processor is configured to allocate a first memory page associated with a process running on the first node to the second memory; the first interface circuit is configured to store a page table indicative of a mapping relationship between a virtual address and a physical address corresponding to the first memory page.

14. The data processing system of claim 13, wherein the page table is arranged to record a number of times the first memory page is accessed; when the number of times the first memory page is accessed reaches a predetermined number of times, the processor is configured to swap the first memory page and a second memory page allocated to the first memory.

15. The data processing system of claim 14, wherein the processor is configured to determine the second memory page according to a least recently used algorithm or a least frequently used algorithm.

16. The data processing system of claim 14, wherein when the number of times the first memory page is accessed reaches the predetermined number of times, the first interface circuit is configured to send an interrupt request to the processor.

17. The data processing system of claim 13, wherein the page table is arranged to record metadata corresponding to the second memory; the metadata is indicative of a memory type of the second memory.

18. The data processing system of claim 13, wherein a portion of bits of the virtual address is arranged to indicate that the first memory page is allocated to the second server.

* * * * *